US006922789B2

(12) United States Patent
Meaney et al.

(10) Patent No.: US 6,922,789 B2
(45) Date of Patent: Jul. 26, 2005

(54) APPARATUS AND METHOD FOR RECALIBRATING A SOURCE-SYNCHRONOUS PIPELINED SELF-TIMED BUS INTERFACE

(75) Inventors: Patrick J. Meaney, Poughkeepsie, NY (US); Jonathan Chen, Yorktown Heights, NY (US); Frank D. Ferraiolo, Essex Junction, VT (US); Kevin C. Gower, LeGrangeville, NY (US); Glenn E. Holmes, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 571 days.

(21) Appl. No.: 09/960,023

(22) Filed: Sep. 21, 2001

(65) Prior Publication Data

US 2003/0070123 A1 Apr. 10, 2003

(51) Int. Cl.$^7$ ............................. H04L 7/00; G06F 13/00
(52) U.S. Cl. ........................................ 713/400; 710/104
(58) Field of Search ........................... 713/400; 710/104

(56) References Cited

U.S. PATENT DOCUMENTS

| | | | | |
|---|---|---|---|---|
| 5,613,071 A | * | 3/1997 | Rankin et al. | 707/10 |
| 5,742,650 A | * | 4/1998 | Nuckolls et al. | 375/376 |
| 6,198,689 B1 | * | 3/2001 | Yamazaki et al. | 365/233 |
| 6,226,734 B1 | * | 5/2001 | Kleinsorge et al. | 712/13 |
| 6,470,458 B1 | * | 10/2002 | Dreps et al. | 713/400 |
| 6,629,222 B1 | * | 9/2003 | Jeddeloh | 711/167 |
| 6,629,257 B1 | * | 9/2003 | Hartwell | 713/502 |

* cited by examiner

Primary Examiner—Lynne H. Browne
Assistant Examiner—Eric Chang
(74) Attorney, Agent, or Firm—Lynn L. Augspurger

(57) ABSTRACT

An SMP computer system has an apparatus and method for recalibrating a self-timed, source-synchronous, pipelined interface while the computer system is running. The apparatus allows for quiescing the interface (ie. idling the processors to allow for no data transfers), raising fences (blocking interfaces), allowing for a quick clock centering recalibration step, and then unfencing and unquiescing to allow for the use of the interface again. The recalibration allows for compensating for drift over time on the interface to compensate for temperature, voltage, cycle time, and end-of-life degradation without bringing down and restarting the system.

13 Claims, 4 Drawing Sheets

APPARATUS AND METHOD FOR RECALIBRATING A SOURCE-SYNCHRONOUS PIPELINED SELF-TIMED BUS INTERFACE

FIELD OF THE INVENTION

This invention relates to symmetrical computer systems, and particularly to an apparatus and method for recalibrating an source-synchronous pipelined interface with minimal impact to a running system, allowing for the system to remain operational, even in the midst of environmental drift or degradation.

Trademarks: S/390 and IBM are registered trademarks of International Business Machines Corporation, Armonk, N.Y., U.S.A. Other names may be registered trademarks or product names of International Business Machines Corporation or other companies.

BACKGROUND

In an SMP (symmetric multiprocessing) computer system with high-level packaging, it is often necessary to allow latencies on cards, wires, or boards that exceed the cycle times of the transferred data. In order to allow these transfers to take place, source-synchronous pipelined interfaces have been used in the s/390 machines of IBM. This allows for the proper capturing of the data within a small window, or 'eye'.

In order to capture this data, there is usually a calibration or learning period. A known data pattern is sent across the interface and the receiver compensates for the various package tolerances using calibration techniques.

However, over time, these large-latency interfaces can drift due to environmental changes like voltage, temperature, end-of-life degradation, etc.

The prior s/390 IBM machines only handled the first calibration. There was no way to re-calibrate an interface once it was up and running. Therefore, the cumulative degradations could eventually cause a system failure.

Also, in a test environment, we often apply environmental stress to a machine as well as frequency changes. We often want to run a hardware/architecture exerciser (like SAK or PCX) under several environments (about 16 voltage corners as well as cycling up or down the frequency), the interface often fails without a re-calibration. If the system is not recalibrated under the new environment, the system must be restarted for every test. Therefore, our test time is jeopardized.

SUMMARY OF THE INVENTION

The invention allows for the re-calibration of the interface at periodic intervals with minor disruption. This invention is applicable to the SMP computer systems sold by IBM and others.

The Steps for Re-Calibration Involve:

1. Putting the system of the interface into a wait state,
2. Performing a fast initialization process for calibration, and
3. Taking the system of the interface out of a wait state The fast initialization process in the preferred embodiment is similar to the prior art, except that there is only one clock centering step, instead of two. Also, the data deskew step is skipped since that step has already been performed as part of the original initialization process.

The step of putting the system into the wait state can be done through several methods as described in the referenced prior art. One way is to idle all the processors while having one processor oversee the recalibration sequence. This same processor may take the system out of the wait state as well.

By keeping the interface from being used, the driving circuits can exclusively send the calibration pattern and the calibration logic can re-center the clock under any new environmental conditions or circuit changes.

The invention can be triggered periodically. This way, the changes to circuit or environmental characteristics over time do not adversely affect the operation of the interface.

Also, the preferred embodiment allows for the proactive running of the recalibration sequence based on a trigger event. For instance, when ECC is used on an interface and a correctable error (CE) is detected, the data is corrected. The CE can trigger an event to recalibrate the interface. This should protect against future CEs, if the original CE was based on a degraded interface.

These and other improvements are set forth in the following detailed description. For a better understanding of the invention with advantages and features, refer to the description and to the drawings.

DESCRIPTION OF THE DRAWINGS

FIG. 1 illustrates prior art high-level design of the components of the source-synchronous pipelined interface; while FIG. 2 illustrates the prior art state diagram for performing the initial calibration of the hardware as performed in conjunction with the prior art; while

Our detailed description explains the preferred embodiments of our invention, together with advantages and features, by way of example with reference to the drawings.

DETAILED DESCRIPTION OF THE INVENTION

Figure 1:
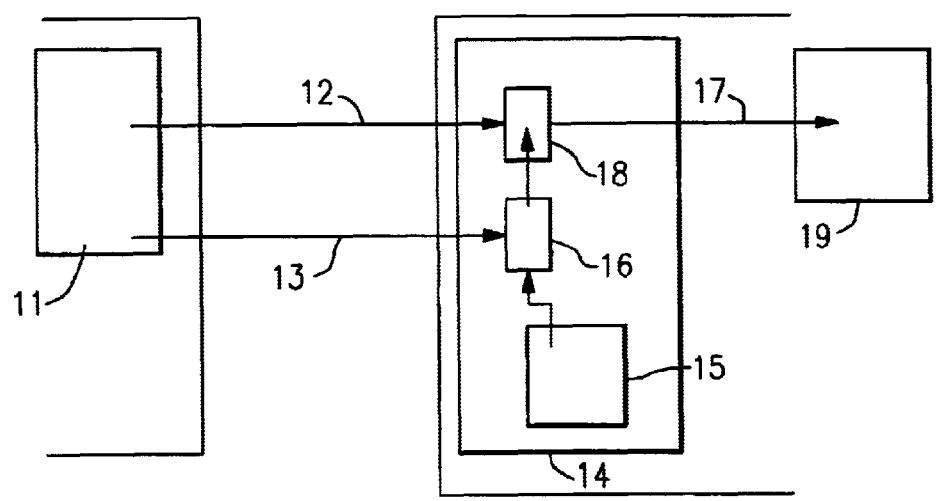

Turning to FIG. 1, notice that there is driver logic, 11, used to drive interface bus, 12, and clock, 13, which feeds receiver calibration logic, 14. Said receiver logic, 14, consisting of state machine logic, 15, clock calibrating hardware, 16, and data de-skew hardware 17. The output of receiver calibration logic, 14, transfers data onto receiver output bus, 18, which connects to system logic, 19.

In the prior art, the system was always recalibrated from a stopped position. The system would be scan-initialized to a reset state and the calibration would begin when the clocks were started. The high-level sequence for the prior art calibration (described in U.S. Pat. No. 6,654,897 of Nov. 25, 2003, entitled: Dynamic Wave-pipelined Interface Apparatus and Methods) included the steps of:

1. Setting interface fences (block interface from being used by system operations)
2. Resetting interface state machine
3. Turning on the driver calibration pattern
4. Calibrating clock
5. Deskewing the data, one bit at a time
6. Recalibrating clock
7. Turning off driver calibration pattern
8. Resetting interface fences The limitation with this sequence is that, once the interfaces are used, there is no means to get the interface recalibrated without resetting the state machine and starting the entire sequence over.

Figure 2:
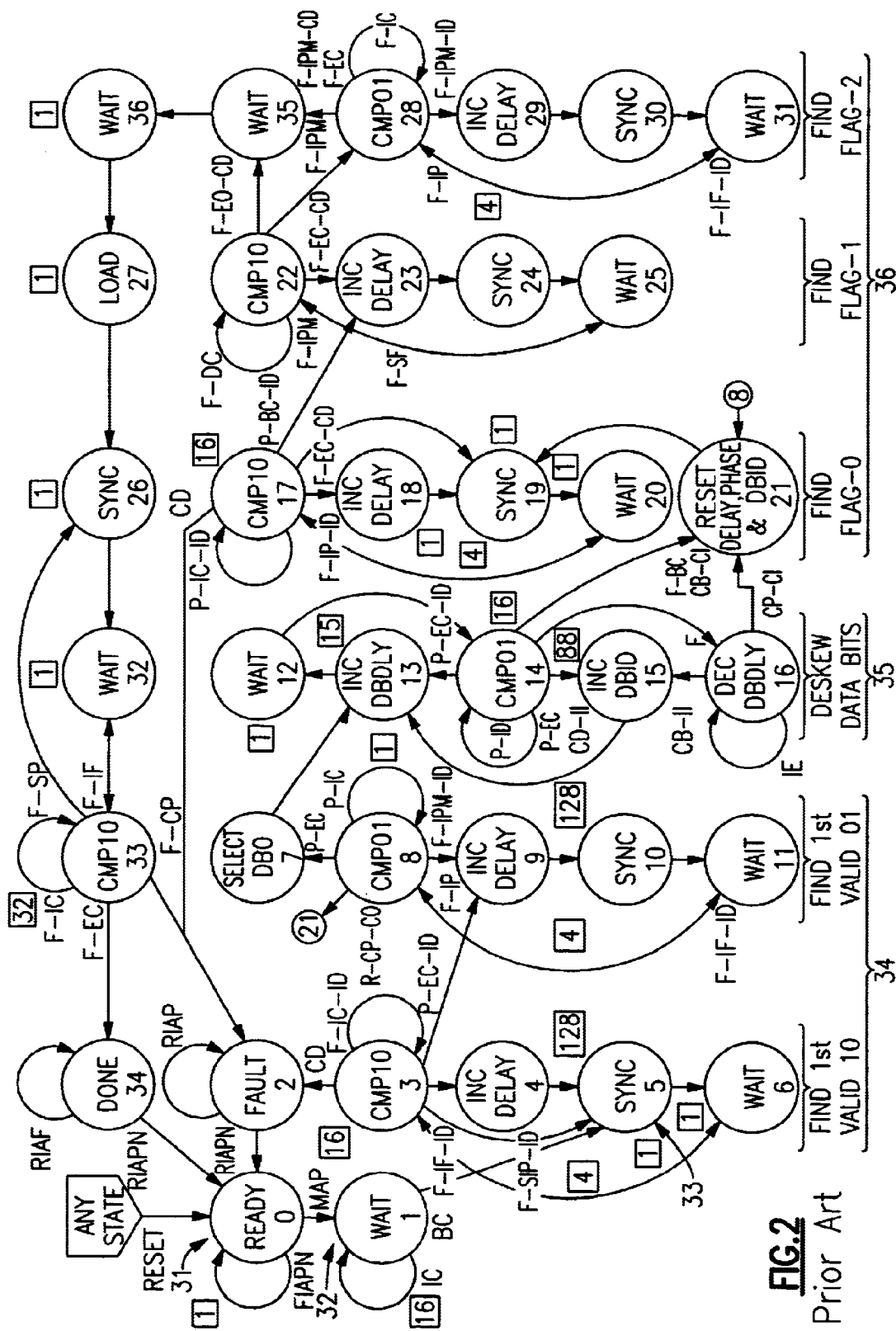

Looking to FIG. 2, notice that the calibration starts at reset state, 31, enters a wait state, 32, and proceeds to a sync state, 33. It then starts the initial clock calibration sequence, 34, data deskew sequence, 35, and final clock sequence, 36.

The preferred method of recalibration is similar to the prior art calibration sequence. However, it includes the additional steps of putting the system into a wait state, running a modified recalibration, and restoring the system from a wait state to a running state.

The preferred embodiment has a system assist processor (SAP) which controls the recalibration sequence. It first signals the other processors to enter a wait state so they do not issue any new commands. Also, the SAP will avoid new commands that utilize the interface to be recalibrated. This will cause the interface which is in need of calibration to eventually become idle.

Then, the SAP uses a hardware interface protocol to read and write registers in the interface logic directly. The SAP writes the Fence registers to make sure the interfaces are truly unused. Then, it loads the driver side calibration flag. This flag signals hardware to drive a repeating pattern across the interface. The pattern for the preferred embodiment is 100010001000 . . . .

The SAP next signals the receiver calibration logic to perform the fast initialization procedure. Since the data deskew has already been done, it is not necessary to perform this lengthy step during recalibration. The fast initialization procedure consists of starting the state machine at the final clock calibration step.

Figures 3, 3A:
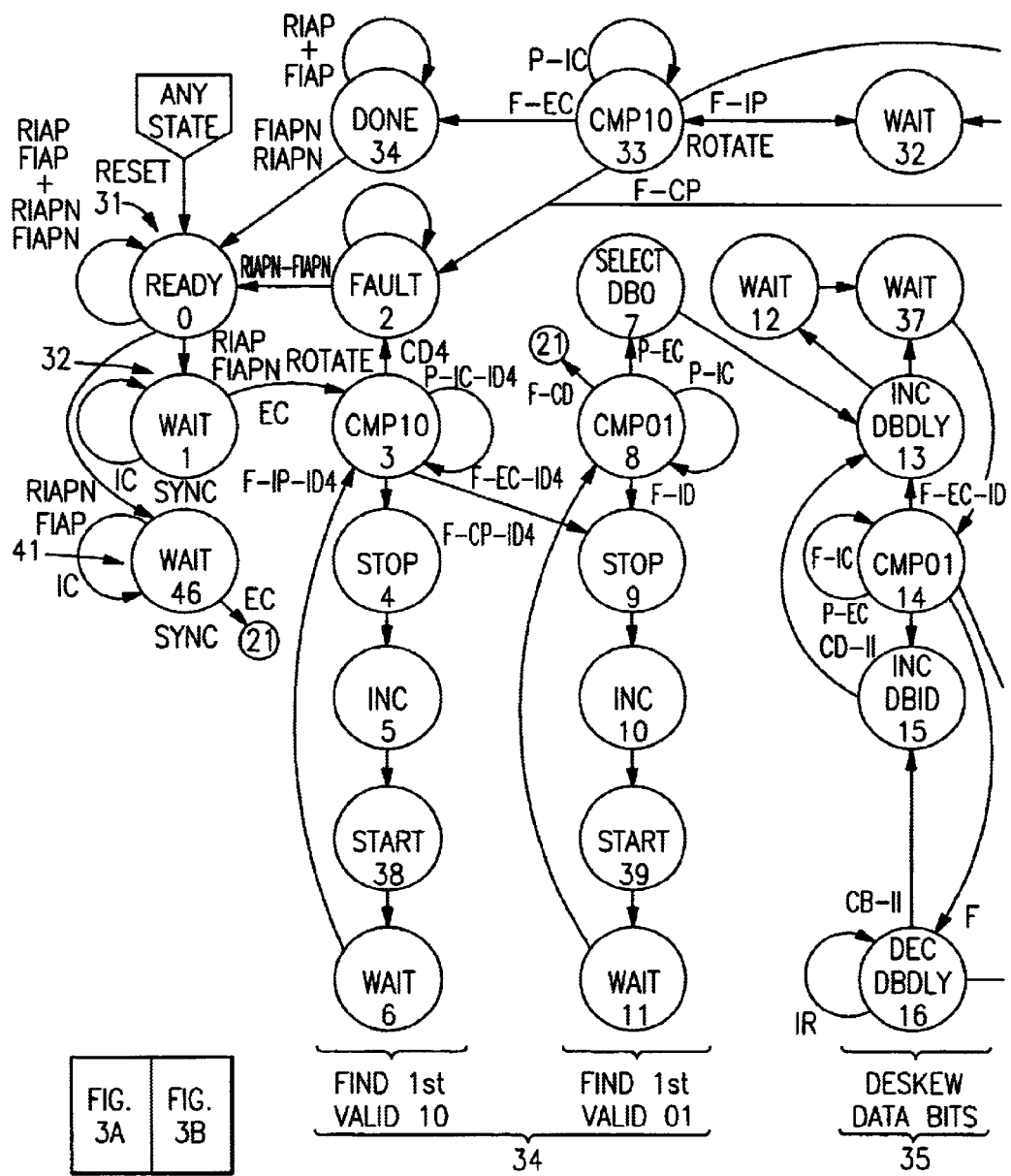
FIG. 3 illustrates the preferred embodiment state diagrams for supporting the initial calibration as well as the recalibration of the hardware as performed in conjunction with the invention.
Figure 3B:
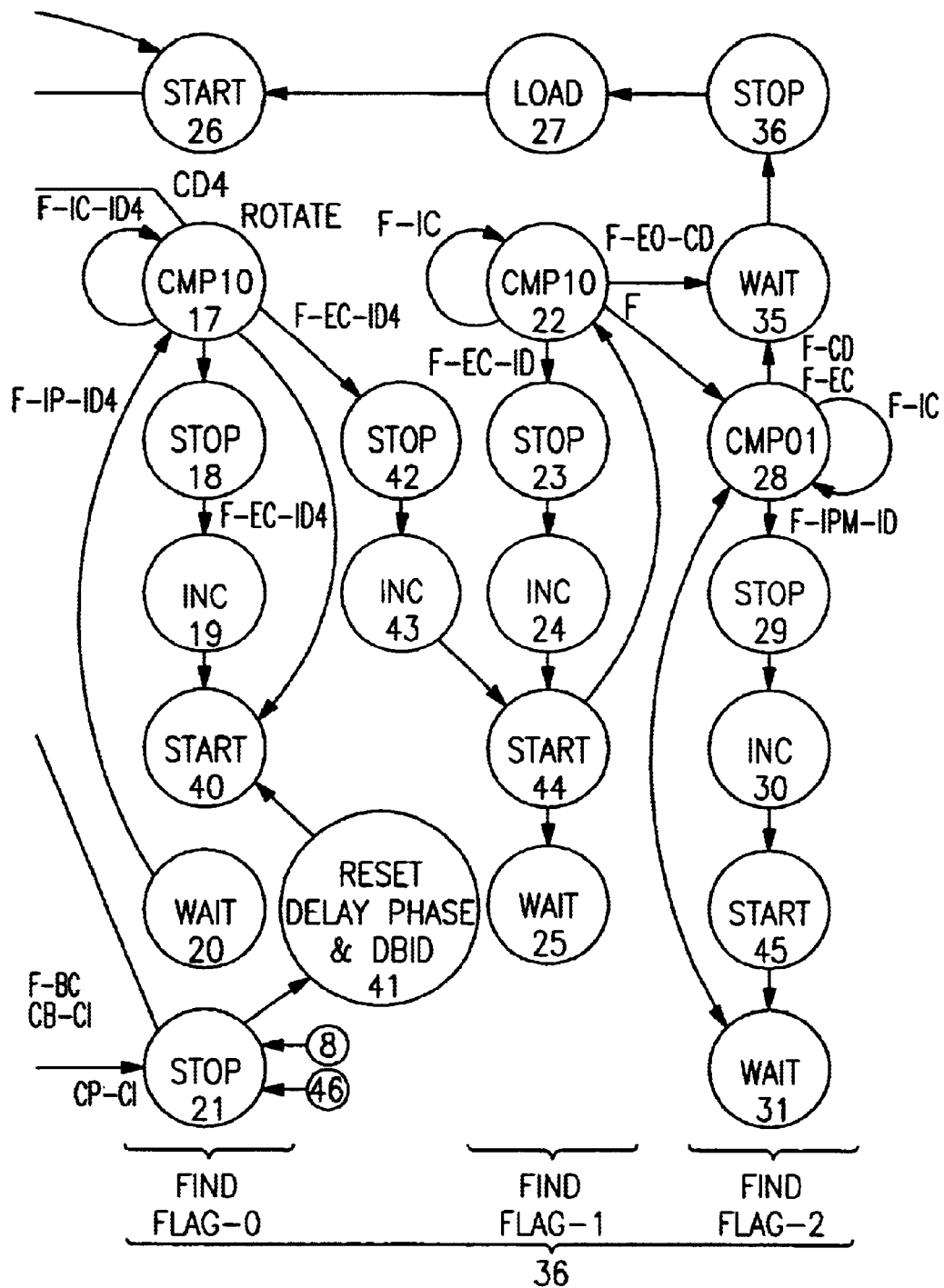

This recalibration can be understood by looking to FIG. 3. Notice that the normal calibration sequences of the initial clock calibration sequence, 34, data deskew sequence, 35, and final clock calibration sequence, 36, still exist. In addition, at the time of recalibration, a new wait state, 41, is used, which allows the calibration logic to proceed directly to the final clock calibration sequence, 36.

The clock delays are reset as part of the final clock calibration sequence. By adding delay to the clock path, the clock calibration logic is able to find the optimum data capture time for the interface. Since the calibration is done periodically, this window gets reoptimized every time recalibration occurs. Also, if the cycle time, voltage, or other changes are made to the environment for testing, the interface can recalibrate to the new conditions. However, the data deskew sequence does not need to be run since the deskew settings are not likely to change since the data nets will tend to track over time.

When the calibration is complete, the SAP turns off the driver calibration pattern, resets the interface fences and takes the processors out of the wait state.

To summarize, the preferred method includes the steps of:
1. Putting the interface or system into a wait state,
2. Setting interface fences (block interface from being used by system operations)
3. Resetting interface state machine
4. Turning on the driver calibration pattern
5. Calibrating clock
6. Turning off driver calibration pattern
7. Resetting interface fences
8. Taking the interface or system out of a wait state.

Although the preferred embodiment recalculates the flag0, flag1, and flag2 values, there are other methods that can be used to recalibrate the clock. For instance, if it is known that only the frequency changes, the change in frequency can be calculated by additional hardware and half the difference can be applied as a delay shift. Although this would be faster, we excluded this form of recalibration due to the complexity and the fact that the preferred embodiment was fast enough to avoid the system hangs that the full calibration would cause. Also, the preferred embodiment uses the same sequences used in the original.

Depending on the interface, the recalibration sequence is slightly different. For strict uni-directional interfaces, all interfaces can be recalibrated simultaneously. However, when bidi interfaces are involved, the calibration must occur in one direction at a time. The directions are predetermined based on the design specifications.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. In an SMP computer system having a source-synchronous, pipelined, self-calibrating bus interface, the method of recalibrating the bus interface, comprising the steps of:
   a) halting operations of said SMP computer system having a source-synchronous, pipelined, self-calibrating bus interface with a system quiesce operation such that the bus interface is not used by the system,
   b) fencing a receiver of the bus interface,
   c) recalibrating the bus interface using clock readjustment,
   d) unfencing the receiver of the bus interface, and
   e) taking the system of the bus interface out of a wait state and commencing operations to allow interface use again.

2. The method according to claim 1, wherein when said step of halting operations is done with a system quiesce operation to avoid using said bus interface to allow recalibrating of the bus interface during said system quiesce operation.

3. The method according to claim 1, wherein said step of calibrating the interface is accomplished by sending and sampling a known data pattern.

4. The method according to claim 1, wherein said step of calibrating the bus interface is accomplished by recalculating the frequency and applying the appropriate delay adjustment to the clock.

5. The method according to claim 1 wherein a quiesce of the system of thin bus interface if performed prior to performing a fast initialization process for calibration, and during calibration, the step of calibrating the bus interface recalculates the frequency of the clock for the bus interface and applies an appropriate delay adjustment to the clock for the bus interface, after which the system for the interface is unquiesced before commencing operations to allow bus interface use again.

6. The method according to claim 5 wherein the recalibration step includes sending a pattern across the interface and adjusting the clock through re-centering without data de-skewing but with shifting to the clock to re-center the bus interface data capturing window for the 'eye' of the data capturing window.

7. The method according to claim 5 wherein the recalibration stem includes re-calculating the clock frequency of the bus interface against the current hardware and re-applying the clock frequency calculation to the clock delay to re-center the clock when the machine is being cycled down to failure and the major change needing re-calibration is cycle time.

8. In an SMP computer system having a source-synchronous bus interface, the method for re-calibration of the bus interface at periodic intervals comprising the steps of:
   a. putting the system of the bus interface into a wait state with a system quiesce operation such that the bus interface is not used by the system,
   b. performing a fast initialization process for calibration,
   c. taking the system of the bus interface out of said wait state and restoring the system to a running state.

9. The method according to claim 8 wherein wherein a step of data deskew has been performed as part of the original system bus interface initialization, end during recalibration of only a single clock centering step for the bus interface is performed during said fast initialization process for calibration without deskewing data during said fast initialization step performed for re-calibration.

10. The method according to claim 9 wherein said wait state keeps the bus interface from being used for processing steps other than re-calibration and sending a calibration pattern and allowing calibration logic to re-center the clock applicable to the bus interface to compensate for new environmental conditions and circuit changes.

11. The method according to claim 10 wherein the recalibration of the bus interface is triggered periodically and in a manner that circuit or environmental characteristics over time do not adversely affect the operation of the bus interface.

12. The method according to claim 10 wherein the re-calibration is based on a trigger event which triggers the steps for re-calibration of the bus interface.

13. The method of claim 8 wherein a state machine controls calibration, and said state machine allows
   a. putting the system of the interface into a wait state and for quiescing the data over the bus interface when the state machine enters a re-calibration state, whereupon,
   b. said a fast initialization process for calibration is performed, and then
   c. a change of said state machine takes the system of the bus interface back out of said wait state; and
   d. allows data to transfer across the bus interface again.

* * * * *